United States Patent
Yang et al.

(10) Patent No.: US 10,651,487 B2
(45) Date of Patent: May 12, 2020

(54) MODULAR APPARATUS OF FUEL CELL SYSTEM

(71) Applicant: Industrial Technology Research Institute, Hsinchu (TW)

(72) Inventors: Cheng-Hao Yang, Tainan (TW); Heng-Ju Lin, Tainan (TW); Fu-Pin Ting, Miaoli County (TW); Jar-Lu Huang, Kaohsiung (TW); Jia-Syun Lyu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 380 days.

(21) Appl. No.: 15/817,297

(22) Filed: Nov. 20, 2017

(65) Prior Publication Data
US 2019/0157692 A1    May 23, 2019

(51) Int. Cl.
| | |
|---|---|
| *H01M 8/04089* | (2016.01) |
| *H01M 8/04007* | (2016.01) |
| *H01M 8/04082* | (2016.01) |
| *H01M 8/22* | (2006.01) |
| *H01M 8/12* | (2016.01) |
| *H01M 8/04701* | (2016.01) |
| *H01M 8/124* | (2016.01) |

(52) U.S. Cl.
CPC ... *H01M 8/04097* (2013.01); *H01M 8/04074* (2013.01); *H01M 8/04201* (2013.01); *H01M 8/04738* (2013.01); *H01M 8/12* (2013.01); *H01M 8/22* (2013.01); *H01M 2008/1293* (2013.01)

(58) Field of Classification Search
CPC ............. H01M 8/0631; H01M 8/0618; H01M 8/04201; H01M 8/04014; H01M 8/04776; C01B 2203/066; C01B 2203/0233; C01B 3/384; C01B 2203/0816
See application file for complete search history.

(56) References Cited

U.S. PATENT DOCUMENTS

| | | | | |
|---|---|---|---|---|
| 2,191,510 | A * | 2/1940 | Whitehurst | C07C 2/76 585/535 |
| 4,692,306 | A * | 9/1987 | Minet | B01J 8/062 422/198 |
| 4,861,348 | A * | 8/1989 | Koyama | B01J 8/062 48/94 |

(Continued)

FOREIGN PATENT DOCUMENTS

| | | |
|---|---|---|
| CN | 102822086 | 12/2014 |
| CN | 106784940 | 5/2017 |

(Continued)

OTHER PUBLICATIONS

Office Action of Taiwan Counterpart Application, dated Oct. 2, 2018, pp. 1-4.

*Primary Examiner* — Imran Akram
(74) *Attorney, Agent, or Firm* — JCIPRNET

(57) ABSTRACT

A modular apparatus of fuel cell system includes a start burner, a reformer, an after-burner, and a heat exchanger. The start burner, the reformer, the after-burner, and the heat exchanger are disposed in a chamber. The start burner is surrounded by the reformer, and the after-burner is disposed on the start burner and surrounds the reformer. The heat exchanger surrounds the after-burner and the reformer.

13 Claims, 4 Drawing Sheets

(56) References Cited

U.S. PATENT DOCUMENTS

| | | | |
|---|---|---|---|
| 5,733,347 A * | 3/1998 | Lesieur | B01J 12/007 |
| | | | 48/61 |
| 6,299,994 B1 * | 10/2001 | Towler | B01J 8/0453 |
| | | | 423/652 |
| 8,304,122 B2 | 11/2012 | Poshusta et al. | |
| 9,406,950 B2 | 8/2016 | Ogawa et al. | |
| 9,419,296 B2 | 8/2016 | Hong et al. | |
| 9,627,701 B2 | 4/2017 | Finnerty et al. | |
| 9,673,466 B2 | 6/2017 | Yoshimine et al. | |
| 9,680,175 B2 | 6/2017 | Dong et al. | |
| 9,692,067 B2 | 6/2017 | Dong et al. | |
| 2002/0071790 A1 * | 6/2002 | Woods | B01J 8/0426 |
| | | | 422/173 |
| 2004/0187386 A1 * | 9/2004 | Wangerow | B01J 8/0449 |
| | | | 48/198.3 |
| 2006/0112637 A1 * | 6/2006 | An | B01J 8/0285 |
| | | | 48/61 |
| 2006/0188434 A1 * | 8/2006 | Mahlendorf | B01J 8/0453 |
| | | | 423/652 |
| 2007/0071653 A1 * | 3/2007 | Miyamoto | B01J 19/0093 |
| | | | 422/129 |
| 2007/0154366 A1 * | 7/2007 | Park | B01J 8/0442 |
| | | | 422/547 |
| 2011/0158867 A1 * | 6/2011 | Son | B01J 8/008 |
| | | | 422/627 |
| 2013/0065145 A1 * | 3/2013 | Goto | C01B 3/384 |
| | | | 429/425 |
| 2013/0252122 A1 * | 9/2013 | Morita | C01B 3/38 |
| | | | 429/425 |
| 2014/0065500 A1 * | 3/2014 | Hong | C01B 3/384 |
| | | | 429/415 |
| 2015/0044589 A1 * | 2/2015 | Yamamoto | F28D 7/1669 |
| | | | 429/425 |
| 2015/0318564 A1 * | 11/2015 | Dong | H01J 8/0631 |
| | | | 429/423 |

FOREIGN PATENT DOCUMENTS

| | | |
|---|---|---|
| EP | 2704242 | 3/2014 |
| TW | I559609 | 11/2016 |

* cited by examiner

MODULAR APPARATUS OF FUEL CELL SYSTEM

TECHNICAL FIELD

The disclosure provides a modular apparatus of fuel cell system.

BACKGROUND

Fuel cell is a new technology and is the fourth type of power generation technology following water power, thermal power and nuclear power generation technologies. It is based on Redox reaction of oxygen or other oxidants to convert chemical energy in fuel into electrical energy. The most common fuel is hydrogen, other fuels may be any hydrocarbons which can be decomposed to obtain hydrogen, such as natural gas and pure methane, etc. Since not being restricted by Carnot cycle, the efficiency of fuel cell is theoretically greater than 80%, but the actual efficiency of fuel cell may be from 50% to 60%.

Solid Oxide Fuel Cell (SOFC) is a fuel cell technique using solid-state ceramic material as electrolyte. The operating temperature of the whole system is between 800° C. and 1000° C., which is categorized as high temperature fuel cell. Therefore, there are many material options to select, the materials can be selected include methane, natural gas, city gas, biomass, diesel and other hydrocarbons. When the hydrocarbon fuel is fed to the system, the feeding material is reformed first to generate the reformed gas mixture of hydrogen, carbon monoxide, carbon dioxide and steam, the electrochemical reaction occurs between the hydrogen and the oxygen at the cathode to generate electricity. Therefore, the advantages of high efficiency, being applicable to variety of fuels, and no requiring the use of precious metals as catalyst can be achieved. Simultaneously, the high temperature when operating may also be applied to increase power generation efficiency or to heat source supply, and thus it has high value of waste heat.

However, because the operating temperature of the solid oxide fuel cell system is extremely high, electronic gas heater is required to supply for the high temperature environmental condition, but the heater is a high energy-consuming device. Therefore, it may reduce the efficiency of the system if the heat source for fuel cell when operating will is provided by this manner. Next, due to the complexity of the solid oxide fuel cell system, there are many pipes connecting between components, which easily leads to heat loss along the pipeline and reduce efficiency of system. Furthermore, the high temperature waste heat generated when the system is operating cannot be reused effectively, so that energy consumption is increased vainly and it is harmful to the environment.

SUMMARY

The disclosure provides a modular apparatus of fuel cell system, capable of making the temperature uniformly distributed inside the equipment and effectively controlling the heat source of the reformer and the heat exchanger, and thus ensuring the temperature regulation of the fuel cell stack, reducing the number of the thermal cycle of the fuel cell stack, and achieving a simplified, safe, stable, and high efficiency system.

A modular apparatus of fuel cell system of the disclosure is disposed in a chamber, and the modular apparatus of fuel cell system includes a start burner, a reformer, an after-burner, and a heat exchanger. The start burner, the reformer, the after-burner, and the heat exchanger are disposed in the chamber. The start burner is surrounded by the reformer, and the after-burner is disposed on the start burner and surrounds the reformer. The heat exchanger surrounds the after-burner and the reformer.

Based on the above, in the modular design of the disclosure, the start burner, the reformer, the after-burner, and the heat exchanger are all disposed in the single chamber. Therefore, it is not required to use high energy-consuming components and devices, so as to reduce heat loss, to use the high temperature waste heat effectively, and to control the temperature instantly, etc.

To make the aforesaid features and advantages of the disclosure more comprehensible, several embodiments accompanied with drawings are described in details as follows.

DETAILED DESCRIPTION OF DISCLOSED EMBODIMENTS

Figure 1:
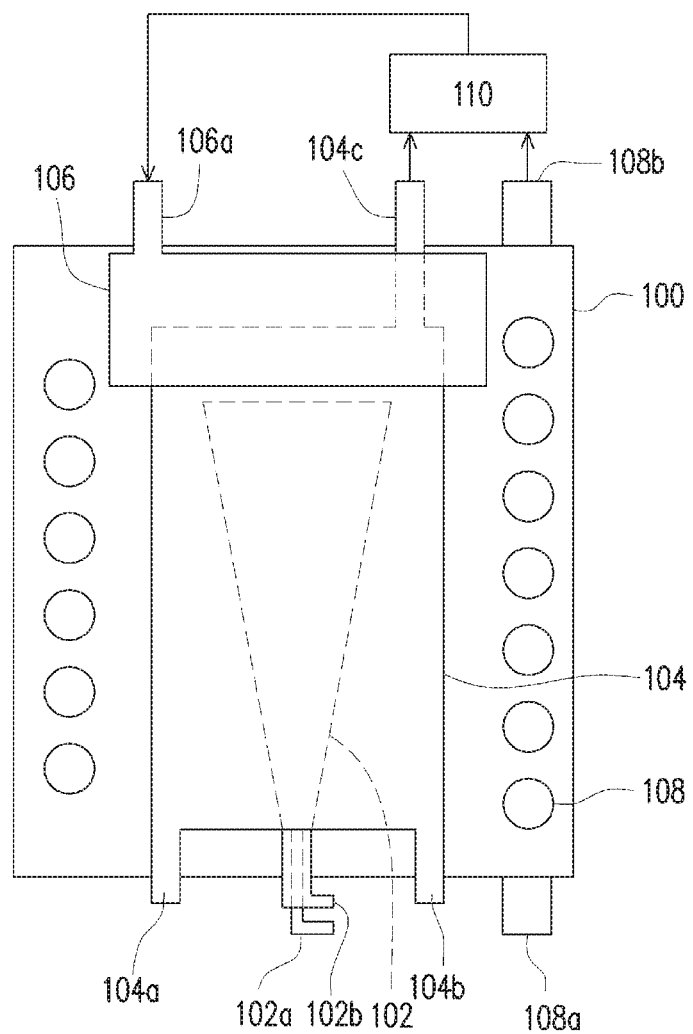
FIG. 1 is a schematic view of a modular apparatus of fuel cell system according to one embodiment of the disclosure.

Please refer to the following embodiments and accompanying drawings to completely understand the disclosure, but the disclosure may be practiced in many different ways and should not be construed as limited to the embodiments set forth herein. In the drawings, for clarity, the components and relative sizes may not be drawn to scale.

FIG. 1 is a schematic view of a modular apparatus of fuel cell system according to one embodiment of the disclosure.

Referring to FIG. 1, a modular apparatus of fuel cell system of the present embodiment is disposed in a chamber 100, and the modular apparatus of fuel cell system includes a start burner 102, a reformer 104, an after-burner 106, and a heat exchanger 108. All of the components are schematically shown in FIG. 1, and the detailed structures thereof will be described hereinafter. The start burner 102, the reformer 104, the after-burner 106, and the heat exchanger 108 are disposed in the chamber 100, and the reformer 104 surrounds the start burner 102, and the after-burner 106 is disposed on the start burner 102 and surrounds the reformer 104. In other words, the after-burner 106 surrounds the top portion of the reformer 104 in order to provide effect of preheating in heat exchanging and steam generation. The heat exchanger 108 surrounds the after-burner 106 and the reformer 104. In FIG. 1, a plurality of circles represents the cross-section of a coiled pipe structure.

Additionally, as shown in FIG. 1, the start burner 102 is a conical structure having small inlet and large outlet. However, the disclosure is not limited thereto, the start burner 102 may also be a cylindrical structure. Since the fuel and air are required when burning, an input pipe having inner and outer pipes may be disposed at the bottom portion of the start burner 102. For example, the input pipe has an inner pipe 102a for inputting fuel and an outer pipe 102b for inputting air. The reformer 104 surrounding the start burner 102 is used to provide reaction fuel (such as hydrogen), which is required at the anode of a fuel cell stack 110, and thus a pipe 104a is used for providing fuel, a pipe 104b is used for providing room-temperature water, and the gas reformed by the reformer 104 may be output by a reformed gas exhaust pipe 104c. The after-burner 106 is used to produce heat source by receiving and mixing high-temperature tail gas mixture from anode and cathode of the fuel cell stack 110 and then burning, and the produced heat source is used to provide a heat source for the reformer 104, so that the after-burner 106 should surround the reformer 104 and has a pipe 106a connected to the anode and cathode of the fuel cell stack 110 to receive the high-temperature tail gas. The heat exchanger 108 is a coiled pipe structure circling along an inner side of the chamber 100, and the heat exchanger 108 has a cold air input port 108a and a hot air output port 108b in order to use the high-temperature gas generated by the start burner 102 or the after-burner 106 to let cold air become hot air, and the hot air would be output for the cathode of the fuel cell stack 110 as reaction fuel.

Each and every component of the modular apparatus of fuel cell system is described in details hereinafter, but the disclosure is not limited thereto.

Figure 2:
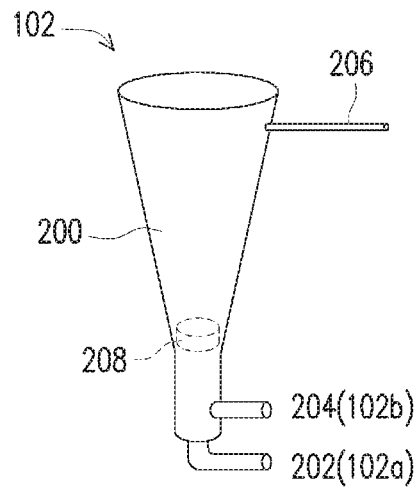
FIG. 2 is a three-dimensional view of a start burner according to the embodiment of the disclosure.

FIG. 2 is a three-dimensional view of a start burner according to the embodiment of the disclosure.

Referring to FIG. 2, when the system starts at normal temperature, the start burner 102 is used to provide a heat source to preheat a reformer (not shown) and a heat exchanger (not shown). The start burner 102 may include a combustion chamber 200, a first fuel input pipe 202, a first air input pipe 204, and a first tail gas exhaust pipe 206. The first air input pipe 204 is disposed at the bottom portion of the combustion chamber 200, the first fuel input pipe 202 is disposed in the first air input pipe 204, and the first exhaust tail gas pipe 206 is disposed at the upper portion of the combustion chamber 200.

In the present embodiment, the start burner 102 further include a gas dispersion cover 208 installed at a tail portion of the first air input pipe 204, so that the air can be evenly dispersed after going through the gas dispersion cover 208. Therefore, when air is inputted to the combustion chamber 200 through the first air input pipe 204, the air passes through the gas dispersion cover 208, so an intake direction of the air is perpendicular to or approximately perpendicular to an extending direction of the first fuel input pipe 202. After being inputted, the air may circle and go upward along the inner surface of the conical combustion chamber 200, so as to form a vortex guiding air flow to guide the dispersed fuel into the combustion chamber 200 to perform combustion reactions. The high-temperature gas after being used is collectively exhausted from the first tail gas exhaust pipe 206. Since the combustion chamber 200 is, for example, a conical structure having small inlet and large outlet, the fluid movement can be increased, thereby enhancing heat transfer efficiency. In addition, by adjusting the feed ratio of fuel to air in the input material, the heat supply after combustion can be adjusted according to the need.

Figure 3:
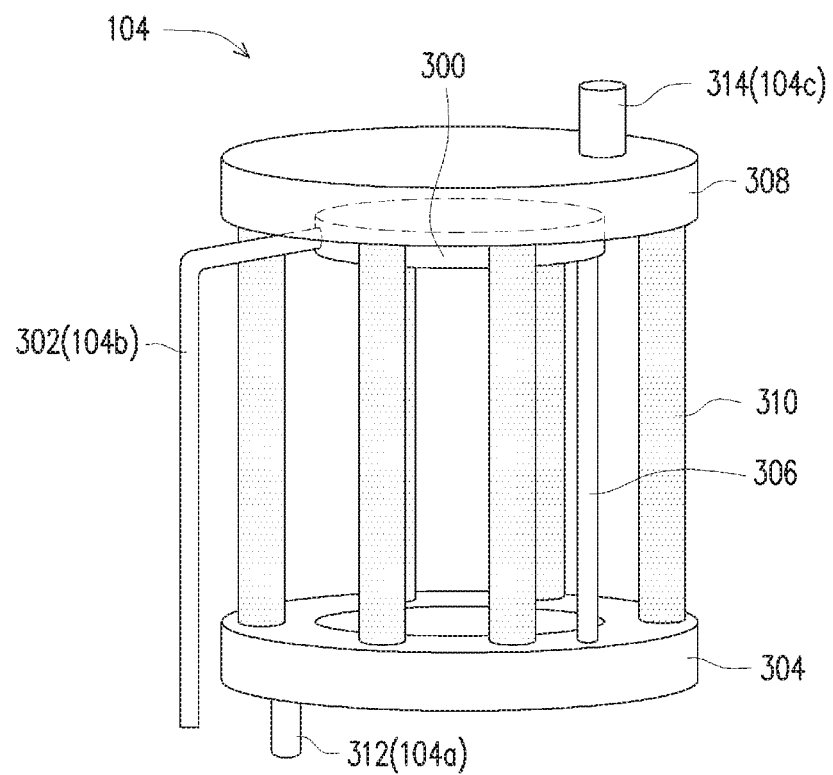
FIG. 3 is a three-dimensional view of a reformer according to the embodiment of the disclosure.

FIG. 3 is a three-dimensional view of a reformer according to the embodiment of the disclosure.

Referring to FIG. 3, the reformer 104 includes a steam generating chamber 300, a water input pipe 302, a fuel mixing chamber of the reformer 304, a steam input pipe 306, a reformed gas mixing chamber 308, a plurality of reforming chambers 310, a second fuel input pipe 312, and a reformed gas exhaust pipe 314. The plurality of reforming chambers 310 connects the fuel mixing chamber of the reformer 304 and the reformed gas mixing chamber 308. The reforming chambers 310 may be straight pipes (or a single spiral pipe), each pipe of the reforming chambers 310 is filled with reforming catalyst inside, the heat generated by the start burner (shown in FIG. 2) or the after-burner (not shown) can be transmitted through the walls of the pipes to the fuel flowing internally and the high-temperature steam, so as to perform reforming reaction and generate hydrogen-rich reformed gas.

The steam generating chamber 300 is disposed above the start burner (shown in FIG. 2) and below the reformed gas mixing chamber 308. The water input pipe 302 extends from the bottom portion of the start burner and connects to the steam generating chamber 300, and the water input pipe 302 may be straight pipes (or a single spiral pipe). The heat generated by the start burner (shown in FIG. 2) or the after-burner (not shown) is transmitted through the pipe wall of the water input pipe 302 to preheat the room-temperature fluid flowing internally and generate steam. The fuel mixing chamber of the reformer 304 is similar to a ring-shaped chamber in order to surround the bottom portion of the start burner (shown in FIG. 2). In order to achieve a better preheating and steam generating effect, the steam generating chamber 300 is, for example, a circular chamber to mix preheated water, and the function thereof is for pre-heating and mixing water. Therefore, after flowing through the water input pipe 302 to the steam generating chamber 300, the room temperature water evaporates and flows through the steam input pipe 306 to the fuel mixing chamber of the reformer 304 in order to mix with the fuel inputted by the second fuel input pipe 312, which is connected to the fuel mixing chamber of the reformer 304, so as to supply fuel and high temperature steam to the reforming chamber 310. Finally, the reformed gas generated in the reforming chamber 310 all flows into the reformed gas mixing chamber 308 (which is a circular chamber, for example), and then flows out together through the reformed gas exhaust pipe 314 to the input (not shown) at the anode side of the fuel cell stack.

Figure 4A:
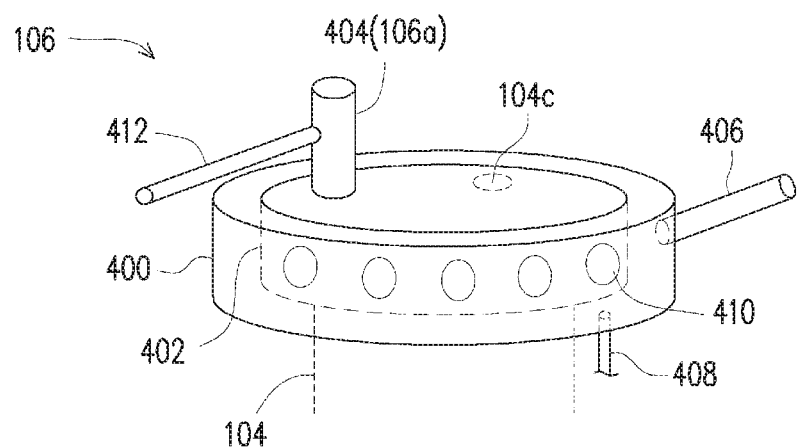
FIG. 4A is a three-dimensional view of an after-burner according to the embodiment of the disclosure.

FIG. 4A is a three-dimensional view of an after-burner according to the embodiment of the disclosure.

Referring to FIG. 4A, the after-burner 106 is configured to recycle and burn the high-temperature tail gas mixture of the anode and cathode (not shown) of the fuel cell stack to generate heat, in order to serve as a heat source to the reformer 104 (including steam generating chamber) and the heat exchanger in high temperature period. The after-burner 106 includes a mixing combustion chamber 400, a fuel dispersing chamber 402, a third fuel input pipe 404, a second air input pipe 406, and a second tail gas exhaust pipe 408. The fuel dispersing chamber 402 is disposed in the mixing combustion chamber 400 and has a plurality of fuel output holes 410. Hence, after the high temperature fuel (such as high temperature tail gas of anode and cathode of the fuel cell stack) flows along the third fuel input pipe 404 and enters the top surface of the fuel dispersing chamber 402 (which has circular structure), the high temperature fuel is uniformly dispersed around through the fuel output holes 410 disposed at the periphery of the circular structure, so as to improve combustion efficiency. The second air input pipe 406 is connected to the side surface of the mixing combustion chamber 400. The second tail gas exhaust pipe 408 is connected to the bottom surface of the mixing combustion chamber 400.

In the present embodiment, the after-burner 106 further includes a fuel-adjusting pipe 412 connected with the third fuel input pipe 404. Moreover, in order to achieve temperature regulating function by the after-burner 106, the fuel-adjusting pipe 412 and the second air input pipe 406, which is used to input air for regulating, may be disposed at two opposite sides of the fuel dispersing chamber 402. By adjusting the feed ratio through the two flow paths, the air-fuel ratio can be adjusted to achieve the purpose of temperature regulating.

Figure 4B:
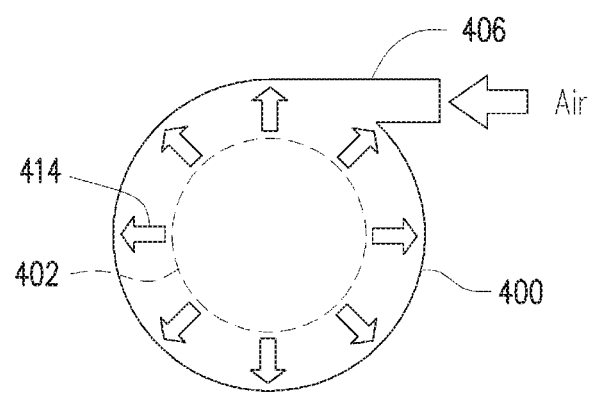
FIG. 4B is a top view of a fuel dispersing chamber of the after-burner in FIG. 4A.

When the air, as shown in FIG. 4B, is guided by the second air input pipe 406 at the side of the mixing combustion chamber 400, it may flow and circle along the inner surface of the mixing combustion chamber 400, so as to form a vortex guiding air flow to guide the dispersed high temperature fuel 414, which flows along the third fuel input pipe 404 and enter the fuel dispersing chamber 402, in the mixing combustion chamber 400 in order to perform combustion reactions and generate high temperature heat to preheat other components.

In another embodiment, the second tail gas exhaust pipe 408 of the after-burner 106 shown in FIG. 4A may be connected with the first tail gas exhaust pipe 206 of the start burner 102 shown in FIG. 2, so as to gather and exhaust the tail gas together.

Figure 5:
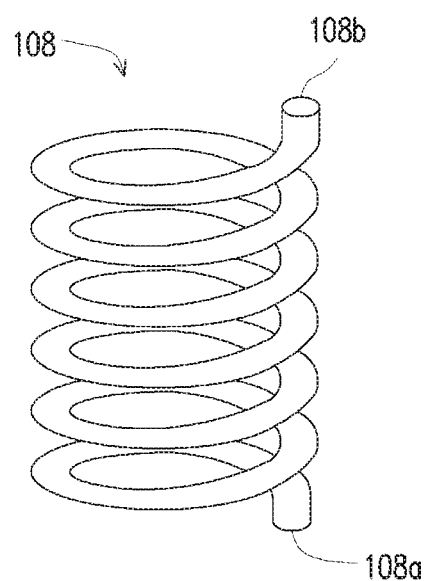
FIG. 5 is a three-dimensional view of a heat exchanger according to the embodiment of the disclosure.

FIG. 5 is a three-dimensional view of a heat exchanger according to the embodiment of the disclosure.

Referring to FIG. 5, the heat exchanger 108 is configured to use the high temperature generated by the start burner (as shown in FIG. 2) or the after-burner (as shown in FIG. 4A) and the material of the pipe serving as heat transfer medium to perform heat exchanging for the purpose of generating steam or preheating air. Therefore, the heat exchanger 108 may be a coiled pipe structure surrounding the after-burner (as shown in FIG. 4A) and the reformer (as shown in FIG. 3) outside of the start burner (as shown in FIG. 2). The heat exchanger 108 has a cold air input port 108a and a hot air output port 108b. The cold air input port 108a is disposed at the bottom portion of the chamber (such as the chamber 100 in FIG. 1), and the hot air output port 108b is disposed at the top portion of the chamber (such as the chamber 100 in FIG. 1).

The experiments verifying the effect of the disclosure are listed as following, but the disclosure is not limited to the following contents.

Table 1 illustrates a comparison based on simulation between the disclosure and the conventional equipment, the results are listed below.

TABLE 1

| Temperature (° C.) | Reformer outlet | Heat exchanger Hot air output port | After-burner outlet |
|---|---|---|---|
| Conventional equipment | 686 | 533 | 756 |
| The disclosure | 985 | 820 | 1006 |
| Percentage of heat loss reduction | 43% | 35% | 33% |

As shown in Table 1, the design in the disclosure is not affected by environment and external piping, so the heat loss is significantly reduced and the waste heat of the peripheral components (BOP) of the fuel cell system is effectively used as a high temperature heat source.

SIMULATION EXPERIMENTAL EXAMPLE

A cylindrical space with a height of 40 cm and a radius of 10 cm is simulated, and a start burner as shown in FIG. 2 is simulated, wherein the start burner has a height of 35 cm, a height of bottom cylinder of 5 cm, a diameter of 4 cm, and a cone angle of 10 degrees.

SIMULATION COMPARATIVE EXAMPLE

A cylindrical space the same as the simulation experimental example is simulated, and a cylindrical start burner is simulated which has a height of 35 cm and a radius of 5 cm.

The heat flow field between the start burner and the reformer is simplified to the cylindrical space simulated above, heat can be exchanged through the outer wall surface with the reformer. The indicator to evaluate the heat transfer optimization: increment of average temperature of the field.

The results show that, compared to the simulation comparative example of cylindrical structure, the start burner having conical structure in the simulation experimental example increases 6.05% in the average temperature of the field, increases 7.83% of Nusselt number, and has an excellent heat transfer effect.

In summary, the reformer, the start burner, the after-burner, and the heat exchanger are integrated in the same chamber in the disclosure. This designed structure has the start burner and the after-burner, so the temperature inside the chamber can be evenly distributed. Also, the air-fuel ratio can be controlled by the separate air input pipes, so as to adjust the temperature inside the apparatus. Moreover, the disclosure can achieve the performances of reducing heat loss, using high temperature waste heat effectively, and controlling the temperature in real-time, etc. without using highly energy-consuming components and equipment. Therefore, a simplified, safe, stable, and high efficiency system can be achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A modular apparatus of fuel cell comprising:
   a start burner comprising a conical combustion chamber;
   a reformer surrounding the start burner and comprising a steam generating chamber disposed above the start burner;
   an after-burner disposed above the start burner and at least partially surrounding the reformer, the after-burner comprising a fuel dispersing chamber having a plurality of fuel output holes; and
   a heat exchanger comprising a coiled pipe structure surrounding the after-burner and the reformer,
   wherein the start burner, the reformer, the after-burner, and the heat exchanger are disposed in a chamber.

2. The modular apparatus of fuel cell system as recited in claim 1, wherein the start burner further comprises:
   a first air input pipe, disposed at a bottom portion of the conical combustion chamber;
   a first fuel input pipe, disposed in the first air input pipe; and
   a first tail gas exhaust pipe, disposed at an upper portion of the conical combustion chamber.

3. The modular apparatus of fuel cell system as recited in claim 2, wherein the start burner further comprises a gas dispersion cover installed at a tail portion of the first air input pipe, such that an intake direction of an air is perpendicular to or approximately perpendicular to an extending direction of the first fuel input pipe.

4. The modular apparatus of fuel cell system as recited in claim 2, wherein the after-burner further comprises:
   a mixing combustion chamber in which the fuel dispersing chamber is disposed;
   a third fuel input pipe connected to a top surface of the fuel dispersing chamber;
   a second air input pipe connected to a side surface of the mixing combustion chamber; and
   a second tail gas exhaust pipe connected to a bottom surface of the mixing combustion chamber.

5. The modular apparatus of fuel cell system as recited in claim 4, wherein the fuel dispersing chamber is a circular structure, and the fuel output holes are disposed at a periphery of the circular structure.

6. The modular apparatus of fuel cell system as recited in claim 4, wherein the after-burner further comprises a fuel-adjusting pipe communicated with the third fuel input pipe.

7. The modular apparatus of fuel cell system as recited in claim 4, wherein the second tail gas exhaust pipe is communicated with the first tail gas exhaust pipe.

8. The modular apparatus of fuel cell system as recited in claim 1, wherein the reformer further comprises:
   a water input pipe extending from a bottom portion of the start burner and connecting to the steam generating chamber;
   a fuel mixing chamber of the reformer surrounding the bottom portion of the start burner;
   a steam input pipe connecting the steam generating chamber with the fuel mixing chamber of the reformer;
   a reformed gas mixing chamber disposed above the steam generating chamber;
   at least one reforming chamber connecting the fuel mixing chamber of the reformer and the reformed gas mixing chamber, wherein a catalyst is disposed in the reforming chamber;
   a second fuel input pipe connected to the fuel mixing chamber of the reformer; and
   a reformed gas exhaust pipe connected to the reformed gas mixing chamber.

9. The modular apparatus of fuel cell system as recited in claim 1, wherein the after-burner further comprises:
   a mixing combustion chamber in which the fuel dispersing chamber is disposed;
   a third fuel input pipe connected to a top surface of the fuel dispersing chamber;
   a second air input pipe connected to a side surface of the mixing combustion chamber; and
   a second tail gas exhaust pipe connected to a bottom surface of the mixing combustion chamber.

10. The modular apparatus of fuel cell system as recited in claim 9, wherein the fuel dispersing chamber is a circular structure, and the fuel output holes are disposed at a periphery of the circular structure.

11. The modular apparatus of fuel cell system as recited in claim 9, wherein the after-burner further comprises a fuel-adjusting pipe communicated with the third fuel input pipe.

12. The modular apparatus of fuel cell system as recited in claim 1, wherein the is a coiled pipe structure circles along an inner side of the chamber, and the heat exchanger has a cold air input port and a hot air output port.

13. The modular apparatus of fuel cell system as recited in claim 12, wherein the cold air input port is disposed at a bottom portion of the chamber, and the hot air output port is disposed at a top portion of the chamber.

* * * * *